US010112450B2

(12) United States Patent
Farooq et al.

(10) Patent No.: US 10,112,450 B2
(45) Date of Patent: Oct. 30, 2018

(54) TOW-HOOK ASSEMBLY

(71) Applicant: Ford Global Technologies, LLC, Dearborn, MI (US)

(72) Inventors: S.M. Iskander Farooq, Novi, MI (US); Nirmal Muralidharan, Birmingham, MI (US); Srinivasan Sundararajan, Ann Arbor, MI (US); Marwan Ahmad Elbkaily, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/416,416

(22) Filed: Jan. 26, 2017

(65) Prior Publication Data
US 2018/0208006 A1    Jul. 26, 2018

(51) Int. Cl.
*B60D 1/18* (2006.01)
*B60D 1/48* (2006.01)
*B60D 1/54* (2006.01)

(52) U.S. Cl.
CPC ............ *B60D 1/185* (2013.01); *B60D 1/488* (2013.01); *B60D 1/54* (2013.01)

(58) Field of Classification Search
CPC .......... B60D 1/18; B60D 1/182; B60D 1/185; B60D 1/187; B60D 1/56; B60D 1/488; B60R 19/48
USPC ............ 280/480, 480.1, 500; 293/106, 117; 242/379, 379.2, 382
See application file for complete search history.

(56) References Cited

U.S. PATENT DOCUMENTS

| | | | | |
|---|---|---|---|---|
| 1,366,353 A * | 1/1921 | Betts | ..................... | B60R 19/023 222/192 |
| 1,427,624 A * | 8/1922 | Newton | .................. | B60R 25/09 188/31 |
| 1,574,552 A * | 2/1926 | Chapman | ............... | B60D 1/185 242/379.2 |
| 1,632,922 A * | 6/1927 | Charles | .................. | B60D 1/185 280/480 |
| 1,695,096 A * | 12/1928 | Hanses | ................. | B60D 1/185 242/382 |
| 2,714,019 A * | 7/1955 | Williams | ............... | B60D 1/185 242/379 |
| 3,182,962 A * | 5/1965 | Gray | ........................ | B66D 5/12 188/71.5 |
| 4,127,295 A * | 11/1978 | Robinson | ................ | B60R 19/48 180/7.5 |
| 4,961,604 A * | 10/1990 | Kisner | .................. | B60P 1/5495 212/180 |
| 5,215,325 A * | 6/1993 | Novotny | ................ | B60D 1/185 280/480.1 |
| 5,791,633 A * | 8/1998 | Walker | .................... | B66D 1/28 254/323 |

(Continued)

FOREIGN PATENT DOCUMENTS

DE       4008467 A1    9/1991
WO     03051654 A1    6/2003

*Primary Examiner* — Anne Marie M Boehler
(74) *Attorney, Agent, or Firm* — Jason Rogers; Brooks Kushman, P.C.

(57) ABSTRACT

A retractable tow-hook assembly may include a vehicle frame and a bumper arranged thereon, a cable attached to the vehicle frame, and a tow-hook arranged at an end of the cable and stored within the bumper during non-use and removed from the bumper and extendable via the cable during use.

12 Claims, 3 Drawing Sheets

(56) References Cited

U.S. PATENT DOCUMENTS

| | | | |
|---|---|---|---|
| 5,967,539 A * | 10/1999 | Digman | B60D 1/28 |
| | | | 280/480 |
| 5,979,953 A * | 11/1999 | Rinehart | B60R 19/48 |
| | | | 293/106 |
| 6,604,884 B1 | 8/2003 | Ohkura | |
| 6,802,522 B1 | 10/2004 | Park et al. | |
| 6,979,016 B1 | 12/2005 | Wegener | |
| 7,758,060 B2 | 7/2010 | Lopez et al. | |
| 8,011,704 B2 | 9/2011 | Nees et al. | |
| 8,276,884 B2 * | 10/2012 | Rusiniak | B60R 19/48 |
| | | | 254/323 |
| 8,308,184 B2 | 11/2012 | Hodoya et al. | |
| 8,684,390 B1 * | 4/2014 | Barrette | B60D 1/185 |
| | | | 242/370 |
| 8,820,804 B2 | 9/2014 | Shibata et al. | |
| 2017/0349016 A1 | 12/2017 | Jordan | |

\* cited by examiner

TOW-HOOK ASSEMBLY

TECHNICAL FIELD

Disclosed herein are tow-hook assemblies.

BACKGROUND

Automotive vehicles may be equipped with tow-hooks to allow a tow strap or chain to be secured to the vehicle frame. Such tow-hooks allow the vehicle to tow an object, or for the vehicle to be towed by another vehicle. Tow-hooks are commonly secured to the vehicle frame by welding the tow-hook to a mounting plate, and then welding the mounting plate to a surface on the vehicle frame to ensure a strong connection between the tow-hook and the vehicle's frame, providing the strength necessary for the tow-hook to be used to tow loads or support the towing of the vehicle by another vehicle.

SUMMARY

A retractable tow-hook assembly may include a vehicle frame and a bumper arranged thereon, a cable attached to the vehicle frame, and a tow-hook arranged at an end of the cable and stored within the bumper during non-use and removed from the bumper and extendable via the cable during use.

A tow-hook assembly may include a vehicle frame and a bumper arranged thereon, and a tow-hook assembly including a tow-hook and a cable, the cable attached to the frame and being wound around a disk within the bumper during non-use of the hook, the cable being releasable from the disk to permit the hook to be removed from the bumper.

A tow-hook assembly may include a vehicle frame and a bumper arranged thereon, and a tow-hook assembly including a tow-hook and a cable assembly. The cable assembly may include a cable attached to the frame via a welded link and a disk, wherein the cable is wound around the disk, the tow-hook assembly being storable within the bumper during non-use, wherein the hook is releasable from the bumper during use by releasing a tension on the cable to permit the hook to be removed from the bumper.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Tow-hooks are used to secure a vehicle to a towline. When these hooks are attached to a front of a vehicle, a portion of the tow-hook often protrudes from the front of the bumper. This portion of the tow-hook may be inconvenient to pedestrians and may result in the pedestrian's legs and knees coming into contact with the protruding part.

Several regulatory agencies may impose requirements on the tow-hooks, specifically those arranged in the front of a vehicle, to prevent contact with pedestrians. For example, the global pedestrian protection technical regulatory requirements, known as GTR 9, may dictate a maximum allowable knee shear impact criteria during a pedestrian impact with a vehicle. In another example, European New Car Assessment Program (EUNCAP) may impose a five-star rating system to grade various tow-hooks. The National Highway Traffic Safety Administration (NHTSA) has also proposed a five-star rating system. Vehicles with protruding tow-hooks arranged in a front of a vehicle may fail to meet these requirements. Thus, a tow-hook assembly that is pedestrian friendly and meets regulatory and NCAP requirements may be beneficial.

Described herein is a retractable tow-hook assembly that is stored within a vehicle's bumper beam during non-use, thus eliminating any protrusion of the tow-hook and eliminating possible impact with a pedestrian. The tow-hook of the tow-hook assembly may be attached to a vehicle frame behind the bumper beam via a cable assembly. The bumper beam may include a clip on its inner surface to receive the hook. The clip may secure the hook to the inside of the bumper and prevent the hook from moving within the bumper, or coming loose from the bumper, while the hook is stored. The cable assembly may include a retractable cable wound around a disk.

When the hook is not in use, the hook may be stored within the bumper and the cable may be wound around the disk. When the tow-hook is needed for possible towing purposes, a user may release the hook from the clip and pull the hook outward from the bumper via an opening in the bumper. The cable may unwind from the disk to allow the hook to extend from the bumper and engage a chain or tether. When the hook is no longer needed, the hook may be re-secured to the clip and stored within the bumper until needed again.

Figure 1:
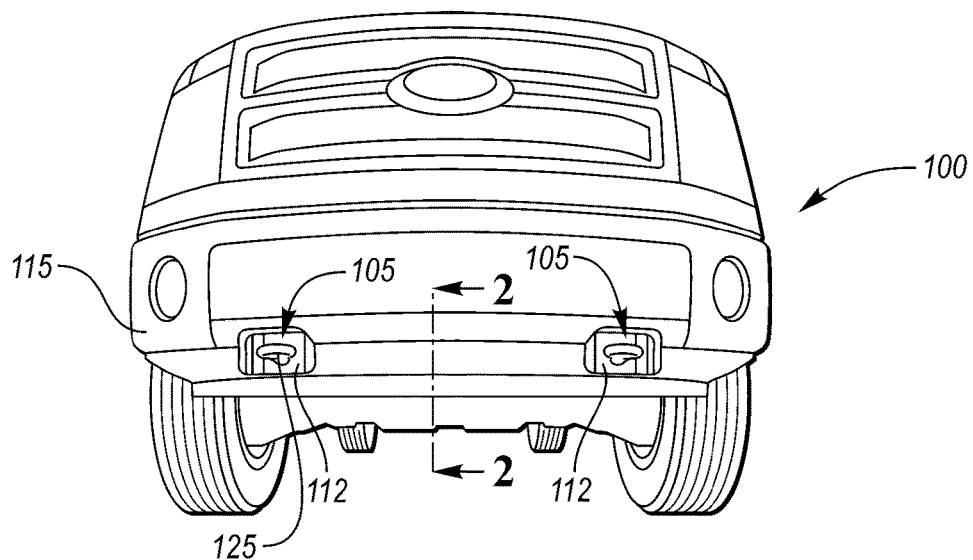
FIG. 1 illustrates an example vehicle having a tow-hook assembly arranged on a front of the vehicle in a partially extended view.

FIG. 1 illustrates a vehicle 100 having a tow-hook assembly 105 arranged on a front of the vehicle 100. In the example in FIG. 1, the tow-hook assembly 105 includes a pair of assemblies arranged on a front of the vehicle 100. The tow-hook assembly 105 may be arranged within a bumper beam 115 and may be recessed or stored within the bumper beam 115 to avoid contact with a pedestrian's leg. The tow-hook assembly 105 may be accessible via an opening 112 within the bumper beam 115. Although FIG. 1 illustrates the tow-hook assemblies 105 as being arranged on the front of the vehicle 100, the tow-hook assemblies 105 may also be arranged on a rear of the vehicle 100.

Figure 2:
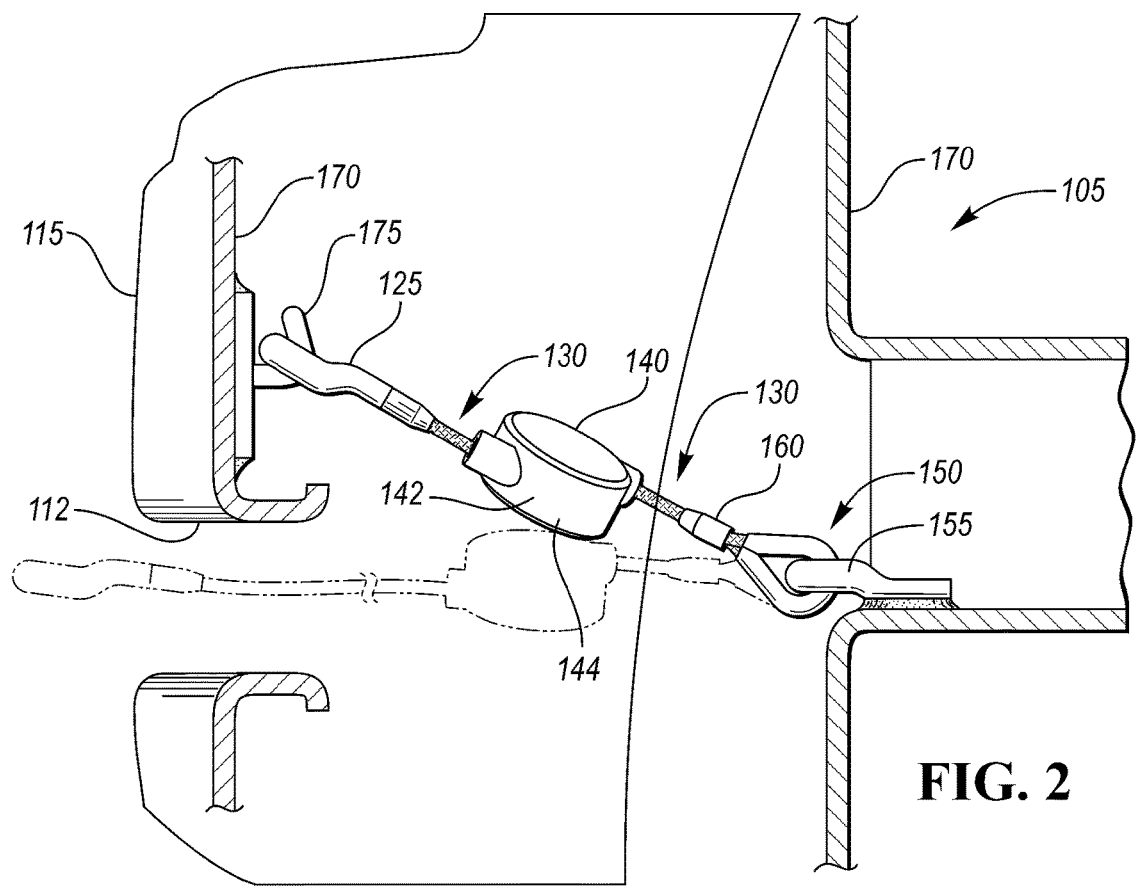
FIG. 2 illustrates a cross-sectional view of the example tow-hook assembly.

FIG. 2 illustrates an example tow-hook assembly 105. The tow-hook assembly 105 may include a hook 125 configured to connect to a strap or chain during towing. The hook 125 may be made from metal or forged steel and designed to hold up to the vehicle maximum load of towing (e.g., 10,000 pounds of towing). The hook 125 may be configured to receive a strap or cable during towing. Various shapes and types of tow-hooks may be implemented. For example, the hook 125 may form a continuous form such as a rectangle or oval. The hook 125 may also form an open hook-type shape. The hook 125 may be a D-ring, a shackle or a tow-ring.

The hook 125 may be fixed to a cable assembly 130. The cable assembly 130 may include a cable 135 configured to be extended during use of the tow-hook 125 and retracted during non-use. The cable 135 may be 40-50 millimeters in length, allowing the hook 125 to extend away from the bumper 115 during use. The cable 135 may be formed of wire and/or metal, as well as other materials. The cable 135 may be strong enough to withhold forces created by towing objects, as well as towing the vehicle 100. The cable 135 may be wound around a disk 140 and the disk 140 may maintain the cable 135 during non-use. In one example, the cable 135 may be loosely maintained around the disc 140. In another example, the cable 135 may be tightly wound around the disc 140 and the disc may include a torsional spring to remove any slack in the cable during non-use.

Figure 4:
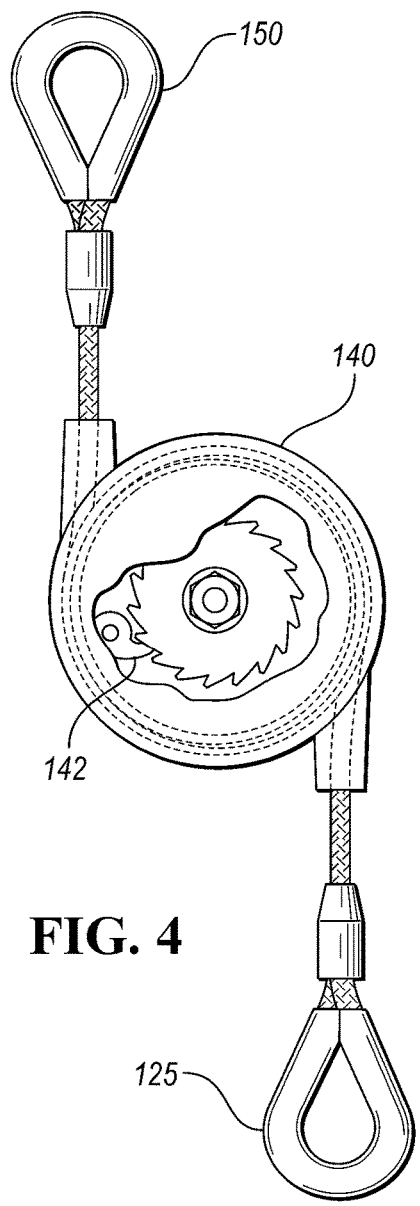
FIG. 4 illustrates a cross-section view of an example disk assembly.

Referring to FIG. 4, the disk 140 may house a spring loaded mechanism 142 configured to permit a pull-pull latch for securing the cable 135 within the disk 140. The disk 140 may include the spring loaded mechanism 142 or ratchet to maintain a taut cable 135 when the cable 135 is in the stowed state.

Figure 5:
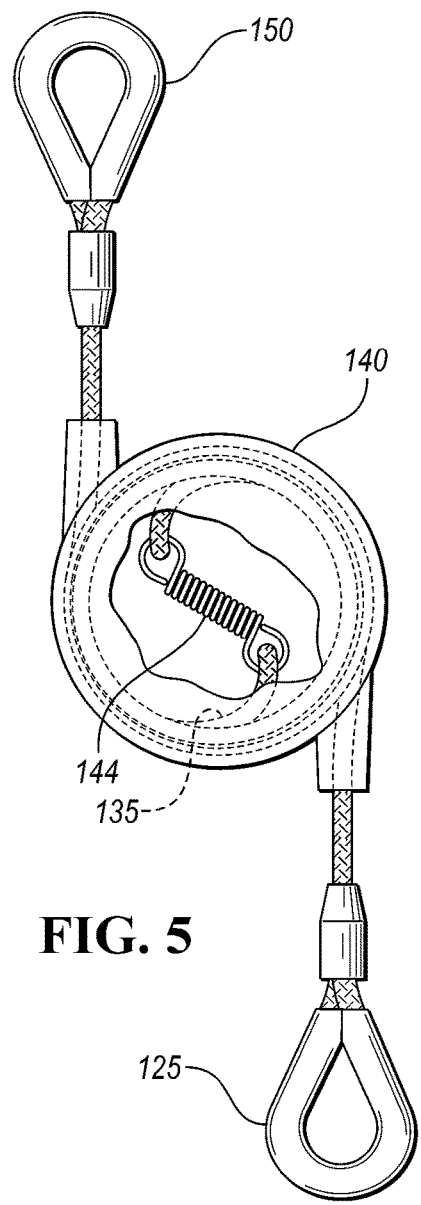
FIG. 5 illustrates a cross-sectional view of another example disk assembly.

Referring to FIG. 5, the disk 140 may also include therein an elastic slack adjuster 144 including a ratchet mechanism for maintaining a taut cable 135, while permitting a flexible cable length to extend from and retract within the disk 140.

The cable assembly 130 may be attached to a frame attachment 150. The frame attachment 150 may include at least one link 155 configured to attach to a frame 180 of the vehicle 100. The frame 170 may be a frame inside the bumper beam 115. The link 155 may be metal (e.g., steel) configured to clamp or weld to the frame 170. The cable 135 may be attached to one of the link 155 via a connector 160 at the end of the cable 135.

As explained, the tow-hook assembly 105 may be stored within the bumper beam 115 during non-use. A clip 175 may be arranged on an inner surface 170 of the bumper beam 115. During non-use, the hook 125 may be secured to the clip 175. The clip 175 may maintain the hook 125 within the bumper beam 115 and may prevent the hook 125 from moving within the bumper beam 115 during non-use. The clip 175 may be in the form of a hook such that a user may easily disengage the hook 125 from the clip 175.

Figure 3A:
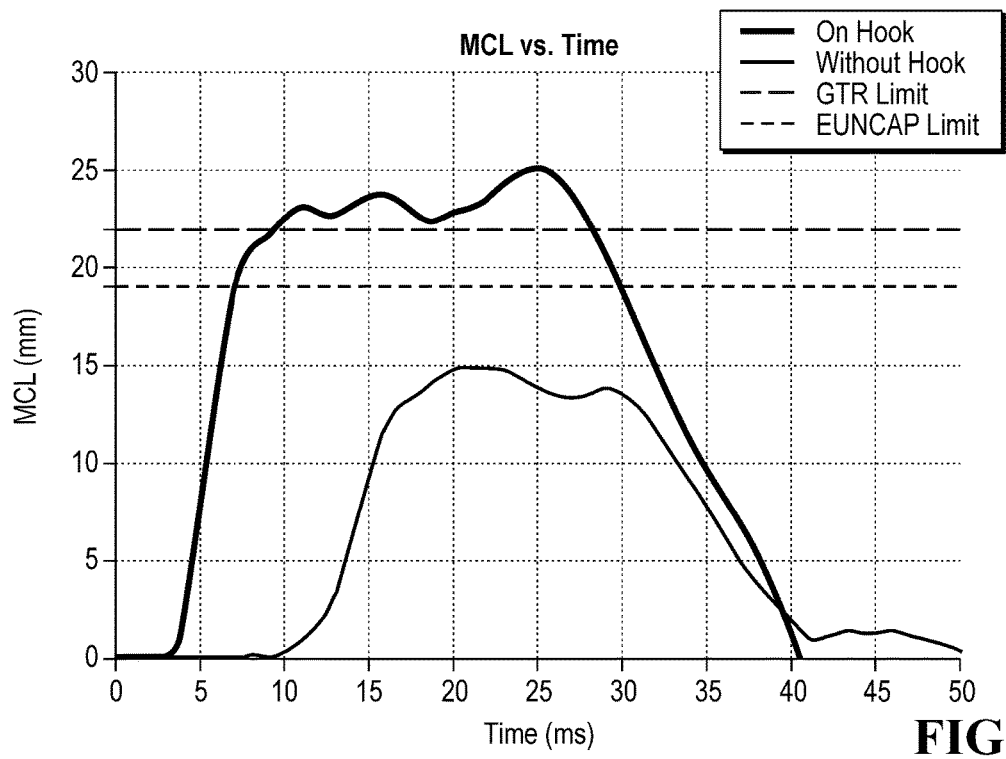
FIG. 3A illustrates an example impact on a pedestrian's medial collateral ligament (MCL) over time.
Figure 3B:
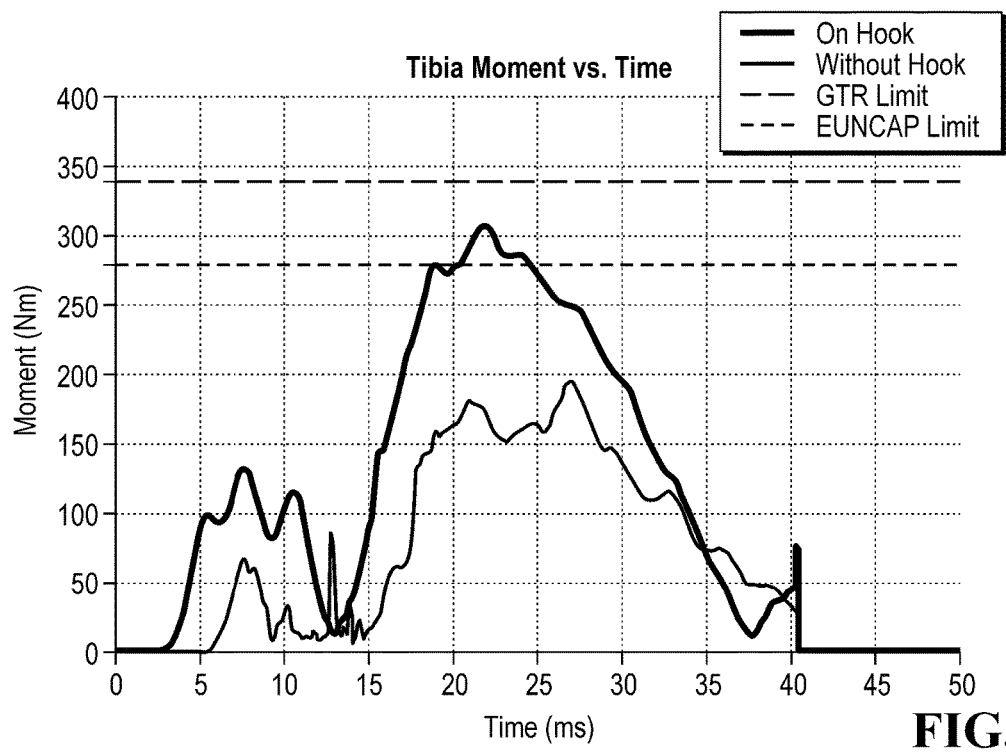
FIG. 3B illustrates an example impact on a pedestrian's tibia over time.

FIGS. 3A and 3B illustrate an effect of a tow-hook on a portion of a pedestrian's lower leg. FIG. 3A illustrates an example impact on a pedestrian's medial collateral ligament (MCL) over time. The impact may be measured in millimeters. FIG. 3A illustrates example GTR and EUNCAP regulatory limits. As can be seen in FIG. 3A, a vehicle having a protruding hook may recognize impacts on the MCL that are above what is permissible under the regulatory limits.

FIG. 3B illustrates an example impact on a pedestrian's tibia over time. Example GTR and EUNCAP regulatory limits are also shown. As can be seen in FIG. 3B, a vehicle having a protruding hook may recognize impacts on the tibia that are above what is permissible under the regulatory limits.

Accordingly, described herein is a tow-hook assembly that protects pedestrian legs and limits impact thereto by including a retractable hook storable within a vehicle bumper beam.

With regard to the processes, systems, methods, heuristics, etc., described herein, it should be understood that, although the steps of such processes, etc., have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein.

While representative embodiments are described above, it is not intended that these embodiments describe all possible forms of the claimed subject matter. The words used in the specification are words of description rather than limitation, and it is understood that various changes may be made without departing from the spirit and scope of the disclosure. Additionally, the features of various implementing embodiments may be combined to form further embodiments that may not be explicitly illustrated or described.

What is claimed is:

1. A retractable tow-hook assembly, comprising:
   a vehicle frame and a bumper arranged thereon;
   a cable wound around a disk within the bumper and attached to the frame;
   a tow-hook arranged at an end of the cable and stored within the bumper during non-use and removed from the bumper and extendable via the cable during use; and
   a clip fixed to an interior surface of the bumper and configured to selectively receive and secure the tow-hook.

2. The assembly of claim 1, wherein the clip is a hook.

3. The assembly of claim 1, wherein the disk includes a torsion spring to retract the cable about the disk.

4. The assembly of claim 1, wherein the cable is attached to the frame by a ring.

5. The assembly of claim 4, wherein the ring is welded to the frame.

6. A retractable tow-hook assembly, comprising:
   a vehicle frame and a bumper arranged thereon;
   a tow-hook assembly including a tow-hook and a cable, the cable attached to the frame and being wound around a disk within the bumper during non-use of the hook, the cable being releasable from the disk to permit the hook to be removed from the bumper; and a clip fixed to an interior surface of the bumper, the clip configured to selectively receive and secure the hook to the bumper during non-use.

7. The assembly of claim 6, wherein the disk includes a torsion spring to retract the cable about the disk.

8. The assembly of claim 7, wherein the clip is a hook.

9. The assembly of claim 6, wherein the cable is attached to the frame by a ring.

10. The assembly of claim 9, wherein the ring is welded to the frame.

11. The assembly of claim 6, wherein the clip is a hook.

12. A retractable tow-hook assembly, comprising:

a vehicle frame and a bumper arranged thereon; and a tow-hook assembly including a tow-hook and a cable assembly, the cable assembly including a cable attached to the frame via a welded link and a disk, wherein the cable is wound around the disk, the tow-hook assembly being storable within the bumper during non-use via a clip fixed to an interior surface of the bumper and configured to selectively receive and secure the tow-hook to the interior surface, wherein the hook is releasable from the clip during use by releasing a tension on the cable to permit the hook to be removed from the bumper.

\* \* \* \* \*